United States Patent
Kitahara et al.

(10) Patent No.: US 9,278,450 B2
(45) Date of Patent: Mar. 8, 2016

(54) ROTATING MECHANISM, INDUSTRIAL ROBOT AND METHOD FOR RETURNING ROTATING BODY TO ORIGINAL POSITION

(75) Inventors: Yasuyuki Kitahara, Nagano (JP); Shigeyuki Kaino, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 234 days.

(21) Appl. No.: 13/816,007

(22) PCT Filed: Apr. 17, 2012

(86) PCT No.: PCT/JP2012/060306
§ 371 (c)(1),
(2), (4) Date: Nov. 8, 2013

(87) PCT Pub. No.: WO2012/147557
PCT Pub. Date: Nov. 1, 2012

(65) Prior Publication Data
US 2014/0331807 A1    Nov. 13, 2014

(30) Foreign Application Priority Data
Apr. 27, 2011    (JP) ................................. 2011-098936

(51) Int. Cl.
*B25J 18/00*    (2006.01)
*B25J 9/16*    (2006.01)
(Continued)

(52) U.S. Cl.
CPC ............... *B25J 9/1669* (2013.01); *B25J 9/042* (2013.01); *B25J 9/101* (2013.01); *B25J 9/1692* (2013.01);
(Continued)

(58) Field of Classification Search
CPC ............ B25J 9/1669; B25J 9/042; B25J 9/04; B25J 9/06; B25J 9/10; B25J 9/101; B25J 9/1692; B25J 9/16; B25J 18/02; B25J 18/00; B25J 17/02; B25J 19/02; H01L 21/67745; H01L 21/67766
See application file for complete search history.

(56) References Cited

U.S. PATENT DOCUMENTS 6,781,337 B2 *   8/2004   Sakamoto ................ B25J 9/042
                                                               318/567
7,566,198 B2 *   7/2009   Yazawa .................... B25J 9/042
                                                               318/568.16
(Continued)

FOREIGN PATENT DOCUMENTS

JP          2-4792       1/1990
JP          2-232191     9/1990
(Continued)

*Primary Examiner* — William Kelleher
*Assistant Examiner* — Jude Agendia
(74) *Attorney, Agent, or Firm* — Frommer Lawrence & Haug LLP

(57) ABSTRACT

A rotating mechanism which returning a rotating body to an original position. The first detecting mechanism for detecting that the rotating body is in the original position is provided with a first section-to-be-detected affixed to the rotating body and the first detecting section affixed to a supporting body. A second detecting mechanism is provided with a swing member attached to the supporting body, an engaging member that lets the swing member swing, a second section-to-be-detected affixed to the swing member, and a second detecting section affixed to the supporting body. The first detecting section detects the first section-to-be-detected at one or two positions, and the second detecting section switches between ON and OFF at one position. The rotating body is first rotated to the position at which the second detecting section switches between ON and OFF, in order to return the rotating body to its original position.

8 Claims, 11 Drawing Sheets

(51) Int. Cl.
 B25J 9/04 (2006.01)
 B25J 9/10 (2006.01)
(52) U.S. Cl.
 CPC ....... B25J 18/00 (2013.01); *G05B 2219/37124* (2013.01); *G05B 2219/50042* (2013.01); *Y10T 74/20317* (2015.01)

(56) References Cited

U.S. PATENT DOCUMENTS

| | | | | |
|---|---|---|---|---|
| 8,863,930 B2* | 10/2014 | Kitahara | .................. | B25J 9/042 192/138 |
| 8,882,430 B2* | 11/2014 | Yazawa | .................... | B25J 9/042 414/222.01 |
| 9,064,919 B2* | 6/2015 | Yazawa | .................... | B25J 9/043 |

FOREIGN PATENT DOCUMENTS

| | | |
|---|---|---|
| JP | 3-66585 | 3/1991 |
| JP | 5-177578 | 7/1993 |
| JP | 6-3581 | 1/1994 |
| JP | 7-29273 | 4/1995 |
| JP | 2003-170384 | 6/2003 |
| JP | 2003-205488 | 7/2003 |
| JP | 2003-260684 | 9/2003 |
| JP | 3648875 | 5/2005 |
| JP | 3776345 | 5/2006 |

* cited by examiner

Fig. 10
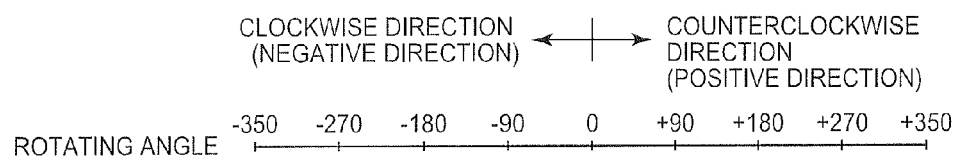
Fig. 11
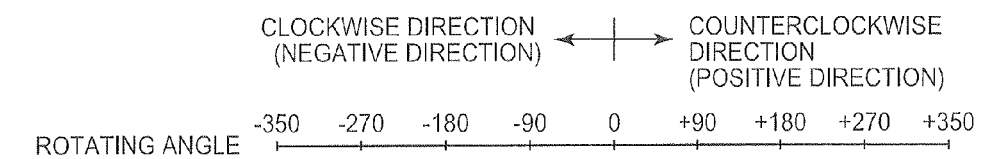
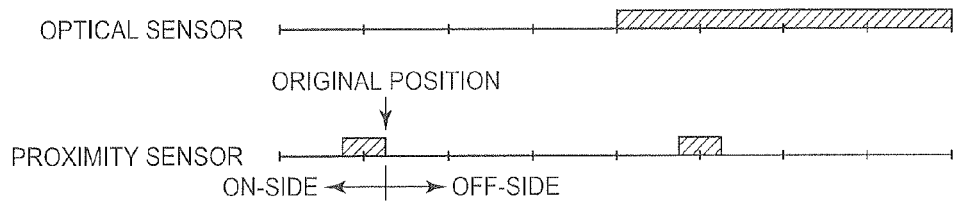

ROTATING MECHANISM, INDUSTRIAL ROBOT AND METHOD FOR RETURNING ROTATING BODY TO ORIGINAL POSITION

The present application claims priority from PCT Patent Application No. PCT/JP2012/060306 filed on Apr. 17, 2012, which claims priority from Japanese Patent Application No. JP 2011-098936, filed on Apr. 27, 2011, the disclosures of which are incorporated herein by reference in their entirety.

FIELD OF THE INVENTION

The present invention relates to a rotating mechanism provided with a rotating body rotatable 360 degrees or more and 720 degrees or less with respect to a supporting body. Also, the present invention relates to an industrial robot provided with the rotating mechanism. Further, the present invention relates to a method for returning the rotating body, which is rotatable 360 degrees or more and 720 degrees or less with respect to a supporting body, to its original position.

It is noted that citation or identification of any document in this application is not an admission that such document is available as prior art to the present invention.

Known is an industrial robot which is provided with an arm member, a rotating shaft rotatable 360 degrees or more and 720 degrees or less supported by the arm member, and a drive motor to rotate the rotating shaft (see Publication of Unexamined Japanese patent application H5-177578 ("JP H5-177578"), for example). The industrial robot described in JP H5-177578 is provided with a detection piece affixed to the rotating shaft and an original position sensor affixed to the arm member. In this industrial robot, the detection piece is detected when the rotating shaft is in the original position; since the rotating shaft rotates 360 degrees or more and 720 degrees or less, the detection piece is detected at two positions in the rotating range of the rotating shaft by the original position sensor. Therefore, in this industrial robot, the function of the detection piece and the original position sensor alone is insufficient to detect that the rotating shaft is in the original position.

To detect that the rotating shaft is in the original position, the industrial robot described in JP H5-177578 is provided with a swing body swingably held by the arm member and an orientation sensor that detects the position of the swing body. The swing body swings following the rotation of the rotating shaft; therefore, in this industrial robot, that the rotating shaft is in the original position is detected based on the detection result of the orientation sensor and the detection result of the original position sensor. In other words, in this industrial robot, even if the detection piece is detected by the original position sensor when the position sensor is off, the rotating shaft is not in the original position; if the detection piece is detected by the original position sensor when the orientation sensor is on, that the rotating shaft is in the original position is detected.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

In the industrial robot described in JP H5-177578, a motor controller for driving a drive motor normally keeps track of the rotating position of the rotating shaft; however, the motor controller may lose track of the rotating position of the rotating shaft for reasons such as errors in the robot. When the motor controller loses track of the rotating position of the rotating shaft, the rotating shaft needs to be returned to the original position. In the JP H5-177578, however, a method for returning the rotating shaft that rotates 360 degrees or more and 720 degrees or less with respect to the arm member is not disclosed.

Therefore, an objective of the present invention is to provide a rotating mechanism in which, no matter to which position the original position of the rotating body, which is rotatable 360 degrees or more and 720 degrees or less with respect to the supporting body, is set, the rotating body can be returned to the original position in a short time with certainty. Another objective of the present invention is to provide an industrial robot that is provided with such a rotating mechanism. Further, another objective of the present invention is to provide a method for returning the rotating body to the original position in which, no matter to which position the original position of the rotating body, which is rotatable 360 degrees or more and 720 degrees or less with respect to the supporting body, is set, the rotating body can be returned to the original position in a short time with certainty.

Means to Achieve the Objectives

To achieve the above objectives, a rotating mechanism of the present invention is provided with a supporting body, a rotating body rotatable 360 degrees or more and 720 degrees or less with respect to the supporting body, a motor for rotating the rotating body, a first detecting mechanism and a second detecting mechanism for detecting that the rotating body is in the original position, and a motor controlling means for controlling the motor; the first detecting mechanism is provided with a first section-to-be-detected which is affixed or formed to either the supporting body or the rotating body and a first detecting section affixed to the other body, either the supporting body or the rotating body, to detect the first section-to-be-detected; the second detecting mechanism is provided with a swing member swingably attached to the supporting body, an engaging member that engages with the swing member to let the swing member swing, a second section-to-be-detected affixed or formed to either the swing member or the supporting member, and a second detecting section affixed to the other body, either the swing body or the supporting body, to detect the second section-to-be-detected; wherein the first section-to-be-detected and the first detecting section are arranged such that the first section-to-be-detected is detected by the first detecting section at one or two positions in the rotating range of the rotating body, the swing member is attached to the supporting body such that the second detecting section switches between ON and OFF at one position in the rotating range of the rotating body, and when returning the rotating body to its original position the motor controlling means controls the motor to first rotate the rotating body to the position at which the second detecting section switches between ON and OFF.

In the rotating mechanism of the present invention, the swing member is attached to the supporting member such that the second detecting section switches between ON and OFF at one position in the rotating range of the rotating body, and when returning the rotating body to its original position the motor controlling means controls the motor to first rotate the rotating body to the position at which the second detecting section switches between ON and OFF. Therefore, the rotating body can be returned to the original position with certainty by performing a specific operation based on the one position in the rotating range of the rotating body at which the second detecting section switches between ON and OFF. For this reason, compared to the case that the rotating body is returned to its original position by being rotated until the first section-to-be-detected is detected by the first detecting section and then by confirming the on-off status of the second detecting section, the rotating body in this invention can be returned to the original position in a short time with certainty no matter to which position the original position of the rotating body is set.

In the present invention, it is preferred that the motor controlling means control the motor to return the rotating body to its original position such that, after being rotated to the position at which the second detecting section switches between ON and OFF, the rotating body is rotated in the predetermined rotating direction and into the range within which the first section-to-be-detected is detected by the first detecting section, and then the rotating body is rotated in the second rotating direction which is the opposite direction from the first rotating direction until the first section-to-be-detected is no longer detected by the first detecting section and finally, rotated in the first rotating direction until the first section-to-be-detected is detected by the first detecting section.

With this configuration, even when the state of the mechanism in which the rotating body is in its original position is the state in which the first section-to-be-detected is in the position to be detected by the first detecting section and in which the second detecting section is at the border position to switch between ON and OFF, the rotating body can properly be returned to its original position. In other words, if the state of the mechanism in which the rotating body is in its original position is the state in which the first section-to-be-detected is in the position to be detected by the first detecting section and in which the second detecting section is at the border position to switch between ON and OFF, the rotating mechanism may have the second detecting section ON this time and OFF the other time when the rotating body is in its original position, due to poor product precision or poor attachment precision in the second detecting section, the second section-to-be-detected and/or the swing member. Therefore, when the on-off status of the second detecting section (more specifically, the status that the second detecting section is ON ((or the second detection section is OFF)) is used as the condition for that the rotating body is returned to the original position) when returning the rotating body to its original position, the rotating body may not properly be returned to the original position; however, configured in the above way, the rotating body can be returned to the original position without using the on-off status of the second detecting section. Therefore, even when the state of the rotating mechanism in which the rotating body is in its original position is the state in which the first section-to-be-detected is in the position to be detected by the first detecting section and the state in which the second detecting section is at the border position to switch between ON and OFF, the rotating body can be properly returned to the original position.

Also, with the above configuration, the rotating body is temporarily rotated in the second rotating direction and then rotated in the first rotating direction to return to the original position; therefore, when for example, the rotating body is rotated in the second rotating direction and then rotated in the first direction, the rotating body can precisely be returned to the original position by reducing the rotating speed of the rotating body.

In the present invention, for example, the second detecting mechanism is provided with a first restricting member which is affixed or formed to the supporting body and abuts on the swing member to restrict the swinging range of one end of the swing member and a second restricting member which is affixed or formed to the supporting body and abuts on the swing member to restrict the swinging range of the other end of the swing member; wherein the engaging member lets the swing member swing between a first restricting position, at which the swing member abuts on the first restricting member, and a second restricting position, at which the swing member abuts on the second restricting member, and the second detecting mechanism detects with the second section-to-be-detected and the second detecting section which position the swing member is in, the first restricting position or second restricting position.

In the present invention, it is preferred that the second detecting mechanism be provided with a first magnetic holding mechanism for holding the swing member in the first restricting position with a magnetic attraction force or magnetic repelling force and a second magnetic holding mechanism for holding the swing member in the second restricting position with the magnetic attraction force or magnetic repelling force. With this configuration, the swing member can be prevented from being wobbly. Consequently, the detection accuracy of the second detecting mechanism can be increased. Also, with this configuration, even when the swing member is held in the first restricting position or in the second restricting position to be kept from being wobbly, there is no need to make the member holding the swing member make contact with the swing member held in the first restricting position or the second restricting position. Consequently, dust and/or noise that may be produced accompanying the swing of the swing member between the first restricting position and the second restricting position can be controlled.

In the present invention, it is preferred that the engaging member be capable of abutting on the swing member so that the swing member held in the first restricting position is pressed against the first restricting member and is also capable of abutting on the swing member so that the swing member held in the second restricting position is pressed against the second restricting member. With this configuration, the rotating range of the rotating body can be restricted by the swing member, the engaging member, the first restricting member and the second restricting member. Consequently, there is no need to provide an additional mechanism to restrict the rotating range of the rotating body, thus simplifying the configuration of the rotating mechanism.

The rotating mechanism of the present invention can be applied to an industrial robot. This industrial robot is configured by a main body section, a first arm which is turnably joined to the main body section with its base end, a second arm as a supporting body which is turnably joined to the front end of the first arm with its base end, a third arm as a rotating body which is rotatably joined to the front end of the second arm with its base end, and a hand which is rotatably joined to the front end of the third arm with its (base) end. In this industrial robot, no matter to which position the original position of the third arm, which is rotatable 360 degrees or more and 720 degrees or less with respect to the supporting body, is set, the third arm can be returned to the original position in a short time.

To achieve the above objective, a method of the present invention for returning the rotating body to its original position is provided with a supporting body, a rotating body rotatable 360 degrees or more and 720 degrees or less with respect to a supporting body, a first detecting mechanism and a second detecting mechanism for detecting that the rotating body is in its original position; the first detecting mechanism is provided with a first section-to-be-detected which is affixed or formed to either the supporting body or the rotating body and a first detecting section which is affixed or formed to the other body, either the supporting body or the rotating body, to detect the section-to-be-detected; the second detecting mechanism is provided with a swing member which is swingably attached to the supporting body, an engaging member which is affixed or formed to the rotating body and engages with the swing member to let the swing member swing, a second section-to-be-detected which is affixed or formed to either the swing member or the supporting member and a second detecting section which is affixed to the other body, either the swing member or the supporting member, to detect the second section-to-be-detected; the first section-to-be-detected and the first detecting section are arranged such that the first section-to-be-detected is detected by the first detecting section at one or two positions in the rotating range of the rotating body, and the swing member is attached to the supporting body such that the second detecting section switches between ON and OFF at one position in the rotating range of the rotating body; wherein when returning the rotating body to its original position, a first rotating step is executed to first rotate the rotating body to the position at which the second detecting section switches between ON and OFF.

In the method of the present invention for returning the rotating body to its original position, when returning the rotating body to its original position, the first rotating step is executed to rotate the rotating body to the position at which the second detecting section switches between ON and OFF. Thus, the rotating body can be returned to the original position with certainty by performing a specific operation based on the one position in the rotating range of the rotating body at which the second detecting section switches between ON and OFF. Therefore, unlike the case that the rotating body is returned to the original position by first rotating the rotating body until the first section-to-be-detected is detected by the first detecting section and then by confirming the on-off status of the second detecting section, the rotating body in the present invention can be returned to the original position in a short time with certainty no matter to which position the original position of the rotating body is set.

In the present invention, it is preferred that the method for returning the rotating body to its original position be provided with a second rotating step performed after the first rotating step to rotate the rotating body in the predetermined first rotating direction and into the range in which the first section-to-be-detected is detected by the first detecting section, a third rotating step performed after the second rotating step to rotate the rotating body in a second rotating direction, which is the opposite direction from the first rotating direction, until the first section-to-be-detected is no longer detected by the first detecting section, and a fourth rotating step performed after the third rotating step to rotate the rotating body in the first rotating direction until the first section-to-be-detected is detected by the first detecting section. With this configuration, the rotating body can be returned to its original position without using the on-off status of the second detecting section; therefore, the rotating body can properly be returned to the original position even if the state of the rotating mechanism in which the rotating body is in its original position is the state in which the first section-to-be-detected is in the position to be detected by the first detecting section and the state in which the second detecting section is at the border position to switch between ON and OFF. Also, with this configuration, when in the third rotating step the rotating body is temporarily rotated in the second rotating direction and then the rotating speed of the rotating body is reduced in the fourth rotating step to return the rotating body to its original position, the rotating body can precisely be returned to the original position.

As described above, in the rotating mechanism of the present invention, the rotating body can be returned to its original position in a short time with certainty no matter to which position the original position of the rotating body, which is rotatable 360 degrees or more and 720 degrees or less with respect to a supporting body, is set. Also, in the industrial robot of the present invention, the third arm can be returned to the original position in a short time with certainty no matter to which position the original position of the third arm, which is rotatable 360 degrees or more and 720 degrees or less with respect to a supporting body, is set. Further, by using the method of the present invention for returning the rotating body to its original position, the rotating body can be returned to the original position in a short time with certainty no matter to which position the original position of the rotating body, which is rotatable 360 degrees or more and 720 degrees or less with respect to a supporting body, is set.

BRIEF DESCRIPTION OF THE DRAWINGS

FIG. 10 shows diagram to explain the relationship of the rotating degrees of the third arm of another embodiment with the detecting range of the optical sensor and the detecting range of the proximity sensor.

FIG. 11 shows diagram to explain the relationship of the rotating angle of the third arm of another embodiment of the present invention with the detecting range of the optical sensor and the detecting range of the proximity sensor.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
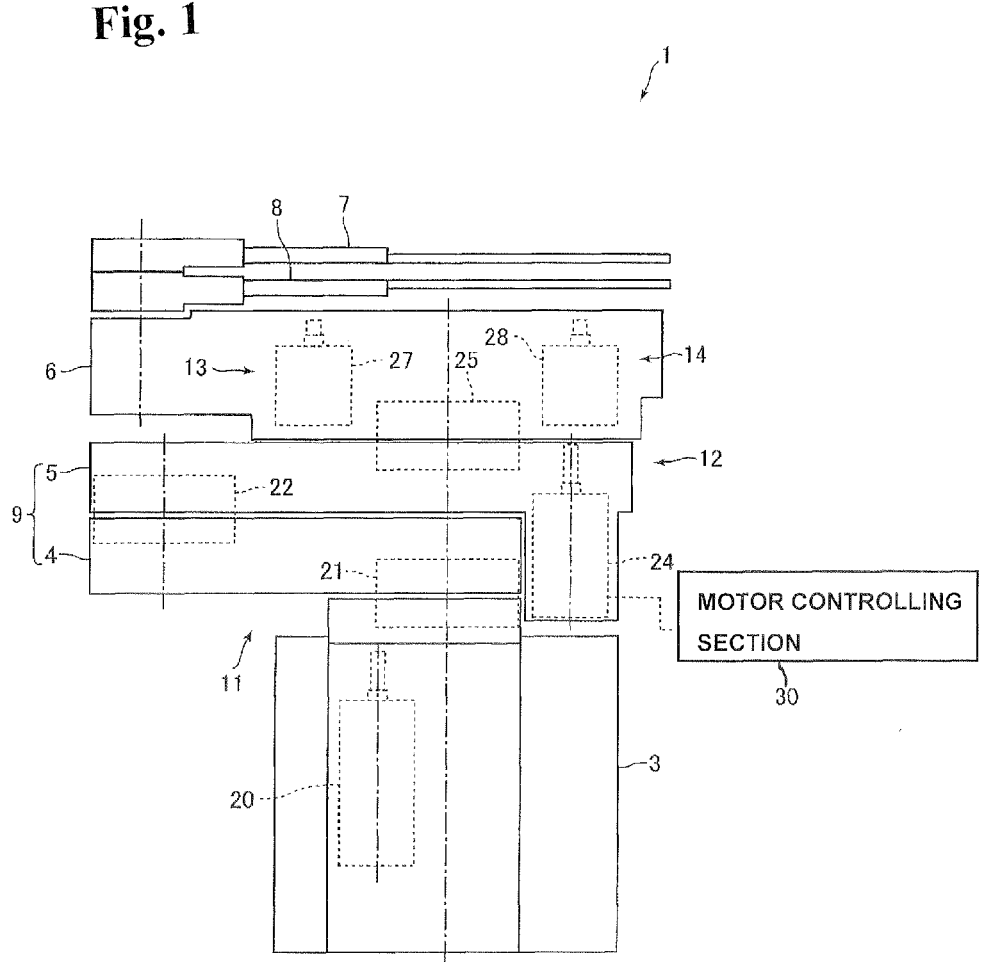
FIG. 1 shows a side view of an industrial robot of an embodiment of the present invention.
Figure 2:
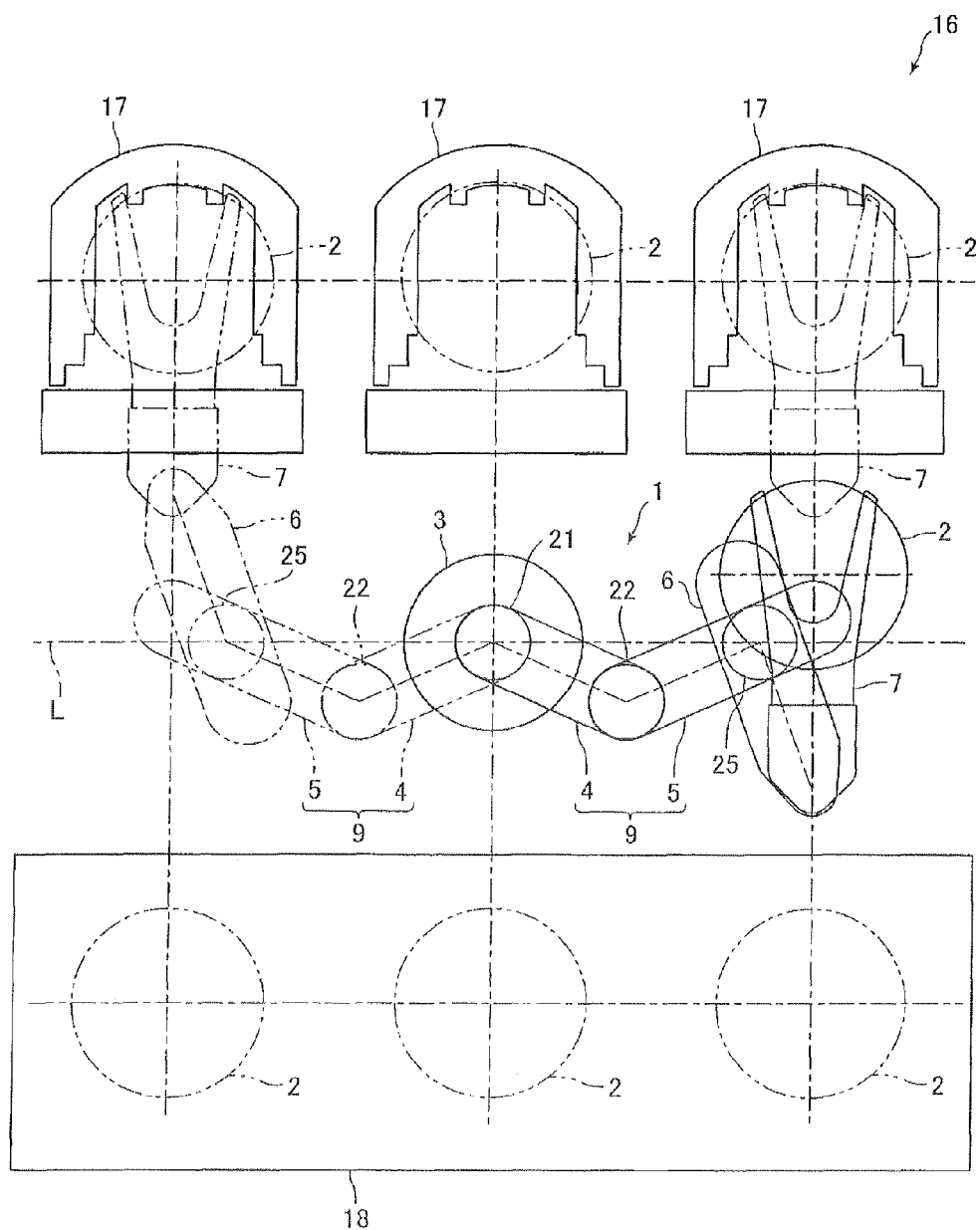
FIG. 2 shows a plan view of a semi-conductor manufacturing system in which the industrial robot shown in FIG. 1 is adopted.

Configuration of Industrial Robot:

FIG. 1 is a side view of an industrial robot 1 of an embodiment of the present invention. FIG. 2 is a plan view of a semiconductor manufacturing system in which the industrial robot 1 shown in FIG. 1 is adopted.

The industrial robot 1 of this embodiment is an articulated robot used for transporting semiconductor wafers 2 (see FIG. 2). The industrial robot 1 is, as shown in FIG. 1, configured by a main body section 3, a first arm 4 turnably joined to the main body section 3, a second arm 5 turnably joined to the first arm 4, a third arm 6 rotatably joined to the second arm 5 and hands 7 and 8 rotatably joined to the third arm 6. Note that the industrial robot 1 is denoted as a "robot 1" and the semiconductor wafer 2 as "wafer 2" in the description below.

The robot 1 is also provided with an arm section driving mechanism 11, which stretches an arm section 9 consisting of the first arm 4 and the second arm 5 by turning the first arm 4 and the second arm 5, a third arm driving mechanism 12 which drives the third arm 6 to rotate, a hand driving mechanism 13 which drives the hand 7 to rotate and a hand driving mechanism 14 which drives the hand 8 to rotate.

As shown in FIG. 2, the robot 1 is installed in the semiconductor manufacturing system 16 for use. More specifically, the robot 1 is arranged at the entrance of the semiconductor manufacturing system to take out a wafer 2 from a cassette 17 and store the wafer 2 in a processing device 18.

The main body section 3 is formed in a cylindrical shape. A lifting mechanism (no illustration) is stored inside the main body section 3 to elevate the first arm 4. The first arm 4, the second arm 5 and the third arm 6 are formed hollow. The base end of the first arm 4 is turnably joined to the main body section 3. The base end of the second arm 5 is turnably joined to the front end of the second arm 5. The base end of the third arm 6 is rotatably joined to the front end of the second arm 5. In this embodiment, the main body section 3, the first arm 4, the second arm 5 and the third arm 6 are arranged in this order from the bottom to the top in the top-bottom direction.

The hand 7 is, as shown in FIG. 2, formed such that the shape thereof is a Y-shape when viewed from the top-bottom direction, and the wafer 2 is placed in the forked front end of the hand 7. The hand 8 is formed in the same shape as the hand 7, and the wafer 2 is placed in the forked front end of the hand 8. The base ends of the hand 7 and 8 are rotatably joined to the front end of the third arm 6. The hands 7 and 8 are arranged to line up in the top-bottom direction. Also, the bands 7 and 8 are arranged above the third arm 6.

Note that, in FIG. 2, the illustration of the hand 8 is omitted. During the operation of the robot 1 of this embodiment, the hand 7 and the hand 8 may sometimes line up in the top-bottom direction, but most of the time, the hand 7 and the hand 8 do not line up with each other. For example, as shown by chain double dashed lines, when the hand 7 is placed inside the cassette 17, the hand 8 has been rotated toward the main body section 3 and is not inside the cassette 17. The rotating angle of the hand 8 with respect to the hand 7 at that time is between 120 degrees and 150 degrees, for example.

The arm section driving mechanism 11 is provided with a first drive motor 20 which is a drive source, a first reduction gear 21 for reducing and transmitting the power of the first drive motor 20 to the first arm 4, a second reduction gear 22 for reducing and transmitting the power of the first drive motor 20 to the second arm 5 and a pulley and a belt (not illustrated) connecting the first reduction gear 21 and the second reduction gear 22. The first reduction gear 21 is a harmonic drive (registered trade mark) which is a harmonic drive gearing, for example, and configures a first joint section which joins the main body section 3 and the first arm 4. The second reduction gear 22 is a harmonic drive (registered trade mark), for example, and configures a second joint section which joins the first arm 4 and the second arm 5.

The third arm driving mechanism 12 is provided with a second drive motor 24 which is a drive source and a third reduction gear 25 which reduces and transmits the power of the second drive motor 24 to the third arm 6. The detailed configuration of the third arm driving mechanism 12 is described later.

The hand driving mechanism 13 is provided with a hand drive motor 27 which is a drive source, a hand reduction gear (not illustrated) for reducing and transmitting the power of the hand drive motor 27 to the hand 7 and a pulley and a belt (not illustrated) that connect the hand 7 and the hand reduction gear. In the same manner as the hand driving mechanism 13, the hand driving mechanism 14 is provided with a hand drive motor 28 which is a drive source, a hand reduction gear (not illustrated) for reducing and transmitting the power of the hand drive motor 28 to the hand 8 and a pulley and a belt (not illustrated) that connect the hand 8 and the hand reduction gear. The hand reduction gear is a harmonic drive (registered trade mark), for example.

In the robot 1 configured as above, when the first drive motor 20 is driven, the arm section 9 stretches such that the center of the third reduction gear 25 moves on the straight line L, as shown in FIG. 2. Also, when the second drive motor 24 is driven, the third arm 6 makes a relative rotation with respect to the arm section 9 having the third reduction gear 25 as the center. Further, when the hand drive motor 27 is driven, the hand 7 makes a relative rotation with respect to the third arm 6; when the hand drive motor 28 is driven, the hand 8 makes a relative rotation with respect to the third arm 6.

By combining the above motions, the robot 1 takes out the wafer 2 from the cassette 17 and stores the wafer 2 into the processing device 18. Note that when the robot 1 transports the wafer 2, the arm section 9, the third arm 6 and the hands 7 and 8 are raised or lowered as needed by the lifting mechanism arranged inside the main body section 3.

Figure 3:
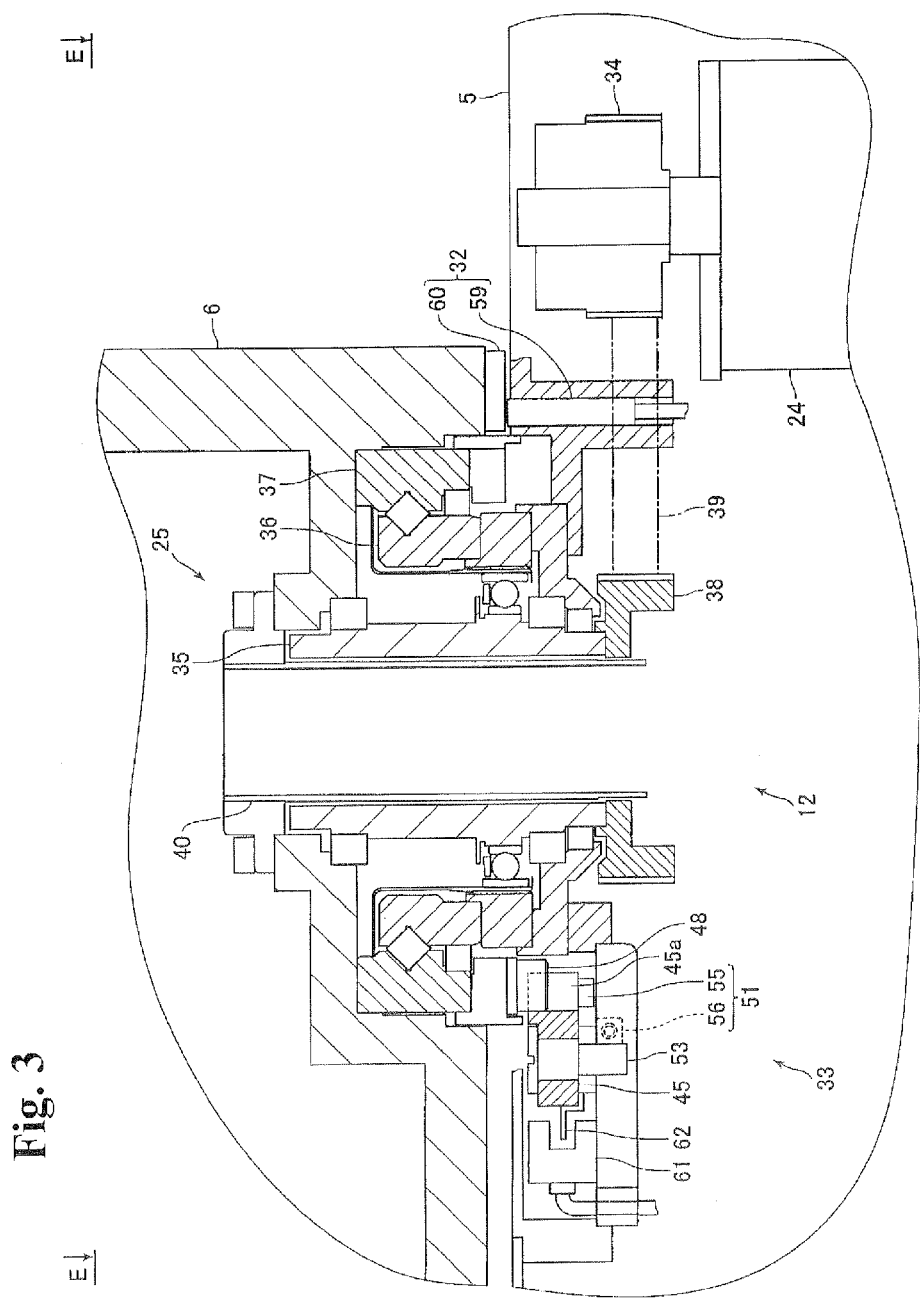
FIG. 3 shows a cross-sectional view of the configuration of a third arm driving mechanism shown in FIG. 1.
Figure 4:
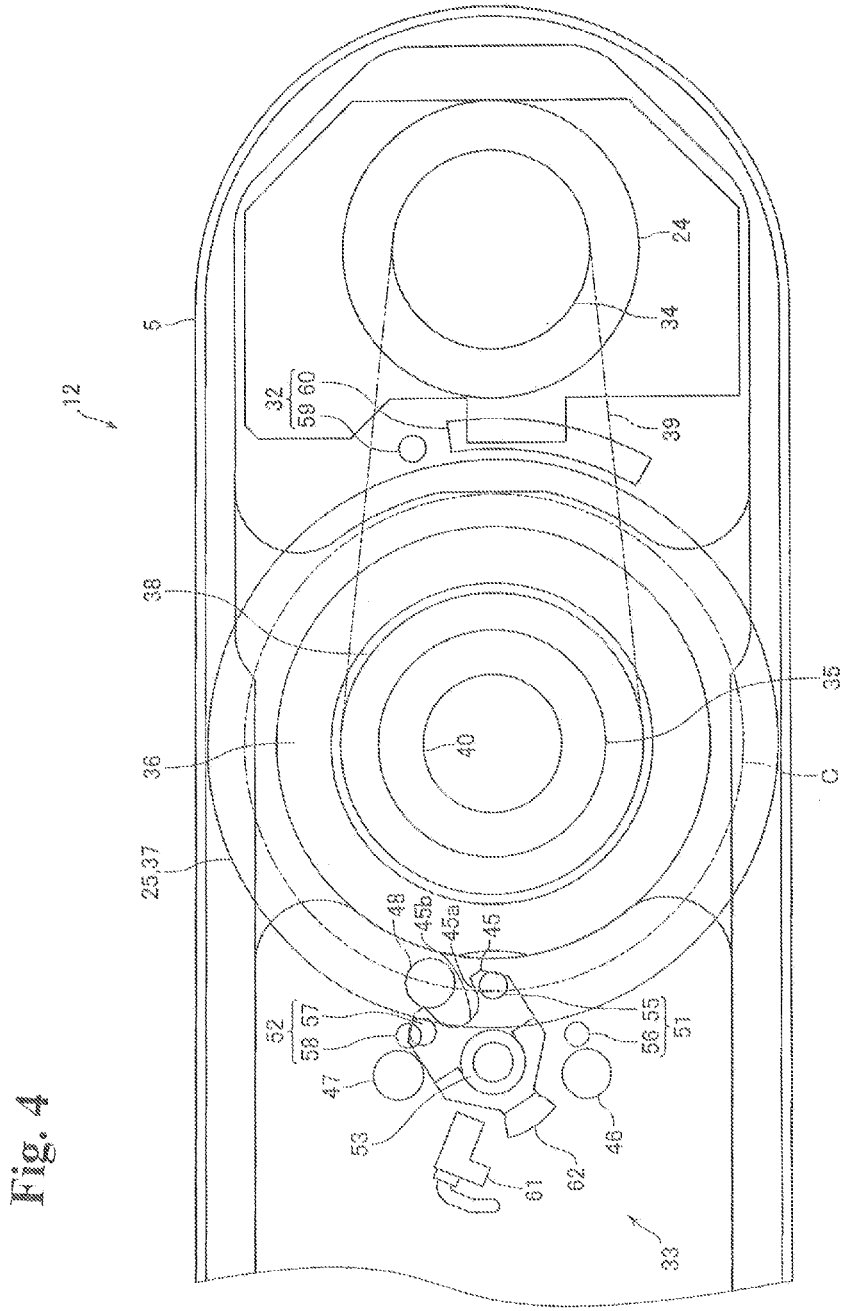
FIG. 4 shows a schematic diagram of the configuration of the third arm driving mechanism from the view point of the E-E direction of FIG. 3.
Figure 5:
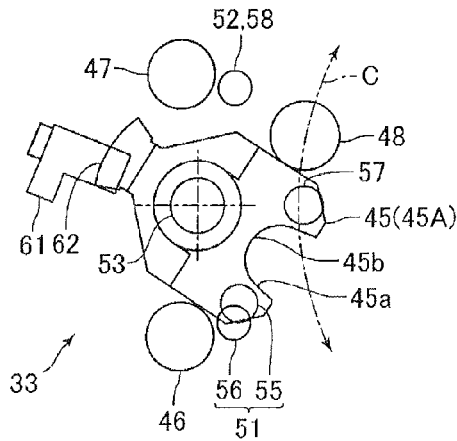
FIG. 5 shows schematic diagrams to explain the operation of a second detecting mechanism shown in FIG. 3.
Figure 5:
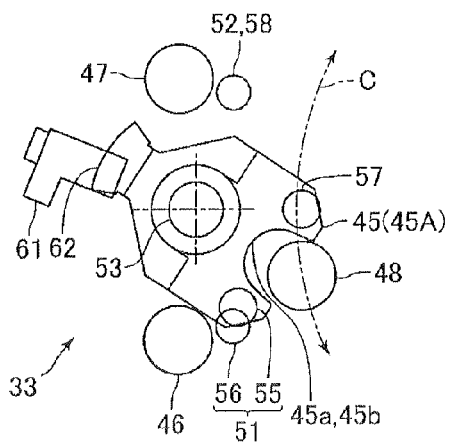
Figure 5:
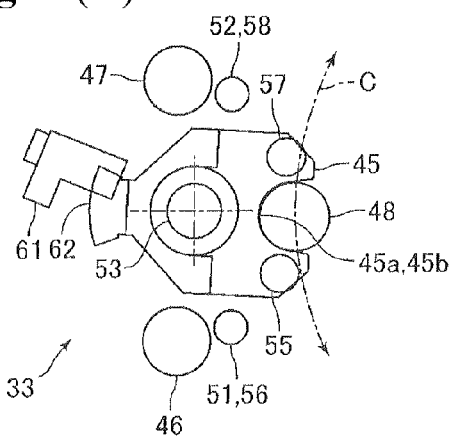
Figure 5:
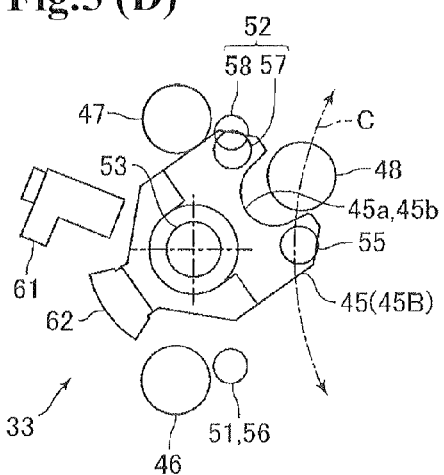
Figure 5:
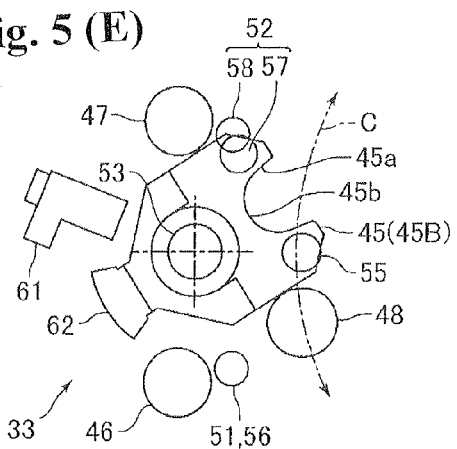
Figure 6:
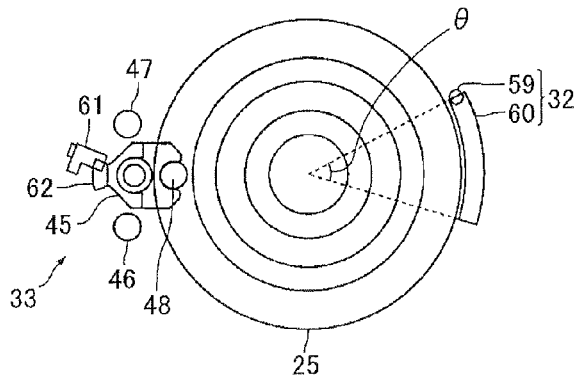
FIG. 6 shows schematic diagrams to explain the detection state of the first detecting mechanism and the detection state of the second detecting mechanism in the rotating range of the third arm shown in FIG. 1.
Figure 6:
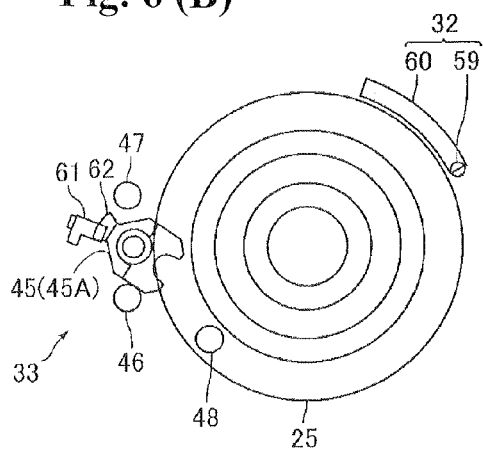
Figure 6:
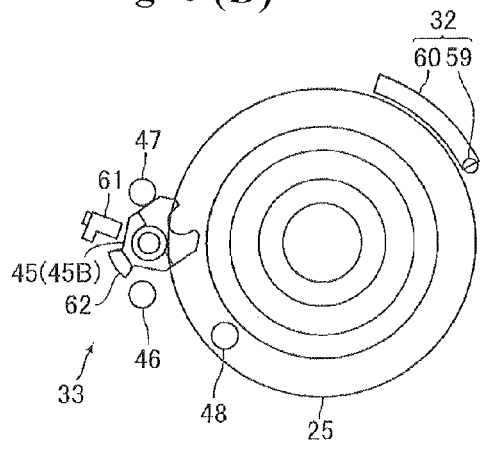
Figure 6:
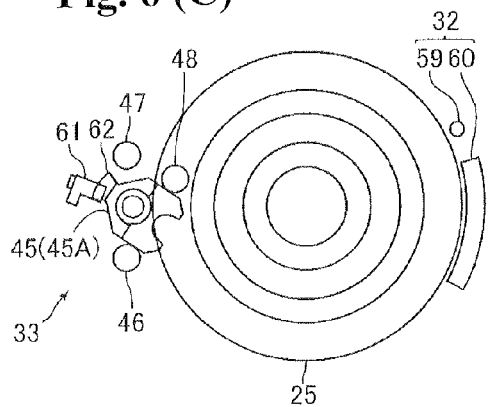
Figure 6:
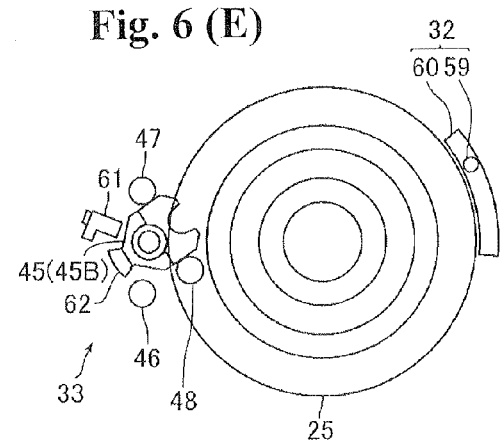
Figure 7:
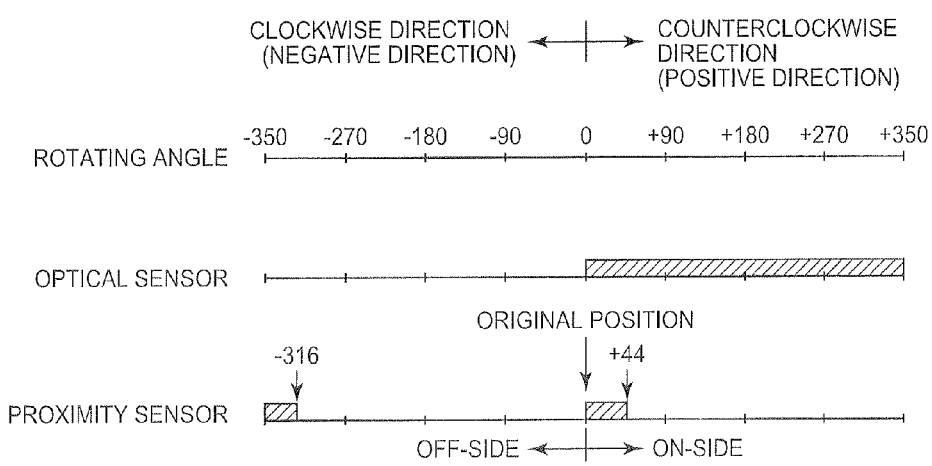
FIG. 7 shows a diagram to explain the relationship of the rotating angle of the third arm with the detecting range of an optical sensor and the detecting range of a proximity sensor.

Configuration of Third Arm Driving Mechanism:

FIG. 3 is a cross-sectional view of the configuration of the third arm driving mechanism 12 shown in FIG. 1. FIG. 4 is a schematic diagram of the configuration of the third arm driving mechanism 12 from the viewpoint of the E-E direction of FIG. 3. FIG. 5 show schematic diagrams to explain the operation of the second detecting mechanism 33 shown in FIG. 3. FIG. 6 shows schematic diagrams to explain the detection state of the first detecting mechanism 32 and the detection state of the second detecting mechanism 33 in the rotating range of the third arm 6 shown in FIG. 1. FIG. 7 shows the relationship of the rotating angle of the third arm 6 shown in FIG. 1 with the detecting range of the optical sensor 61 and the detecting range of the proximate sensor 59.

The third arm driving mechanism 12 is, in addition to the above-described second drive motor 24 and the third reduction gear 25, also provided with a first detecting mechanism 32 and a second detecting mechanism 33 to detect if the third arm 6 is in its original position. The second detecting mechanism 33 of this embodiment functions to restrict the rotating range of the third arm 6 with respect to the second arm 5 as well.

The second drive motor 24 (hereinafter denoted as a "motor 24") is a servomotor. Connected to the motor 24 is a motor controlling section 30 as a motor controlling means to control the motor 24 (see FIG. 1). The motor 24 is attached to the front end of the second arm 5. More specifically, the motor 24 is affixed to more toward the front side than the position at which the third reduction gear 25 is arranged. A pulley 34 is affixed to the output shaft of the motor 24.

The third reduction gear 25 configures a third joint section that joins the second arm 5 and the third arm 6. The third reduction gear 25 is a harmonic drive (registered trade mark) and is provided with a wave generator 35, a circular spline 36 and flexspline 37 as shown in FIG. 3. The flexspline 37 is affixed to the third arm 6. The circular spline 36 is affixed to the front end of the second arm 5. On the bottom end of the wave generator 35 a pulley 38 is affixed. Over the pulley 38 and the pulley 34 affixed to the output shaft of the motor 34 a belt 39 is bridged. In this way, the wave generator 35 configures the input shaft of the third reduction gear 25 and the flexspline 37 configures the output shaft of the third reduction gear 25.

A hollow shaft 40 which is arranged to pass through the center of the third reduction gear 25 is affixed to the front end of the second arm 5 having its top-bottom direction as the axial direction. The wave generator 35 is rotatably arranged at the outside circumference of the hollow shaft 40. In this embodiment, a predetermined wiring is pulled through the inner circumference of the hollow shaft 40.

The second detecting mechanism 33 is provided with a swing member (a swing piece) 45 swingably attached to the second arm 5, a stopper 46 as a first restricting member that abuts on the swing member 45 to restrict the swinging range of one end of the swing member 45, a stopper 47 as a second restricting member that abuts on the swing member to restrict the swinging range of the other end of the swing member 45 and an engaging pin 48 as an engaging member that engages with the swing member 45 to let the swing member 45 swing. In this embodiment, the third arm 6 is rotatable 360 degrees or mote and 720 degrees or less with respect to the second arm 5, and the second detecting mechanism 33 restricts the rotating range of the third arm 6 which is rotatable 360 degrees or more and 720 degrees or less. Note that the third arm 6 of this embodiment is rotatable about 700 degrees.

Also, the second detecting mechanism 33 is provided with a first magnetic holding mechanism 51 which holds the swing member 45 with the magnetic attraction force in the first restricting position 45A (see FIG. 5 (A)) at which the swing member 45 abuts on the stopper 46 and a second magnetic holding mechanism 52 which holds the swing member 45 with the magnetic attraction force in the second restricting position 45B (see FIG. 5 (E)) at which the swing member 45 abuts on the stopper 47.

The engaging pin 48 is formed in a cylindrical shape. The engaging pin 48 is affixed on the bottom face of the flexspline 37 via the predetermined members. In other words, the engaging pin 48 is affixed to the third arm 6 via the flexpline 37, etc. The engaging pin 48 engages with an engaging recess 45a which is formed in the swing member 45 and described later, to allow the swing member 45 to swing between the first restricting position 45A and the second restricting position 45B.

The swing member 45 is formed of a non-magnetic material in a block shape. The swing member 45 is swingably supported by the supporting shaft 53 affixed to the second arm 5 and is capable of swinging by pivoting about the supporting shaft 53. The supporting shaft 53 is affixed to the second arm 5 having the top-bottom direction as the axial direction. Also, the supporting shaft 53 is affixed to the second arm 5 on the outer side of the third reduction gear 25 in the diameter direction. In other words, as shown in FIG. 4, when viewed from the top-bottom direction, the center of the swinging of the swing member 45 is located outside the imaginary circle C which is the trace of the center of the engaging pin 48 rotating with the third arm 6. Also, the supporting shaft 53 is arranged more toward the base end of the second arm 5 than the third reduction gear 25.

In the swing member 45 the engaging recess 45a is formed to engage with the engaging pin 48 when the swing member 45 swings between the first restricting position 45A and the second restricting position 45B. The engaging recess 45a is formed such that the shape thereof viewed from the top-bottom direction is in a U-shape, and the side face of the engaging recess 45a has a semi-arc concave surface 45b thereon. The inside diameter of the concave surface 45b is equal to the outside diameter of the engaging pin 48. Note that since the engaging recess 45a is formed having a U-shape when viewed in the top-bottom direction, the swing member 45 of this embodiment is formed having a U-shape when viewed in the top-bottom direction.

The stopper 46, 47 is formed in a cylindrical shape. The stopper 46 is affixed to the second arm 5 such that it abuts on one side face of the swing member 45 in the swinging direction of the swing member 45, and the stopper 47 is affixed to the second arm 5 such that it abuts on the other side face of the swing member 45 in the swinging direction of the swing member 45. Also, the stopper 46 and 47 are affixed to the second arm 5 such that the swinging angle of the swing member 45 is between about 20 degrees and 30 degrees, for example.

The engaging pin 48, as shown in FIG. 5 (A), is capable of abutting on the other side face of the swing member 45 positioned in the first restricting position 45A to press the one side face of the swing member 45 against the stopper 46; when the engaging pin 48 abuts on the other side face of the swing member 45 positioned in the first restricting position 45A to press the one side face of the swing member 45 against the stopper 46, the rotating range of one end of the third arm 6 to which the engaging pin 48 is affixed via the flexpline 37, etc. is restricted. Also, as shown in FIG. 5 (E), the engaging pin 48 is capable of abutting on the one side face of the swing member 45 positioned in the second restricting position 45B to press the other side face of the swing member 45 against the stopper 47; when the engaging pin 48 abuts on the one side face of the swing member 45 positioned in the second restricting position 45B to press the other side face of the swing member 45 against the stopper 47, the rotating range of the other end of the third arm 6 is restricted.

When the third arm 6 is rotated clockwise in FIG. 5 from the position shown in FIG. 5 (A) and the engaging pin 48 rotates about 330 degrees with respect to the center of the third reduction gear 25, the engaging pin 48 abuts on the side face of the engaging recess 45a as shown in FIG. 5 (B), and then engages with the engaging recess 45a as shown in FIG. 5 (C). As the engaging pin 48 abuts on the side face of the engaging recess 45a and engages with the engaging recess 45a, the swing member 45 turns from the first restricting position 45A to the second restricting position 45B following the rotation of the third arm 6, as shown in FIG. 5 (B) through (D). Also, in the process in which the swing member 45 turns from the first restricting position 45A to the second restricting position 45B, the engaging pin 48 comes off the engaging recess 45a as shown in FIG. 5 (D). Further, with the further clockwise rotation of the third arm 6 by 330 degrees, for example, the engaging pin 48 abuts on the one side face of the swing member 45 to restrict the clockwise rotation of the third arm 6 as shown in FIG. 5 (E).

In the same manner, when the third arm 6 is rotated counterclockwise in FIG. 5 from the state of the mechanism shown in FIG. 5 (E) and the engaging pin 48 rotates about 330 degrees pivoting about the center of the third reduction gear 25, the engaging pin 48 abuts on the side face of the engaging recess 45a and then engages with the engaging recess 45a as shown in FIG. 5 (C). As the engaging pin 48 abuts on the side face of the engaging recess 45a and engages with the engaging recess 45a, the swing member 45 turns from the second restricting position 45B to the first restricting position 45A following the rotation of the third arm 6, as shown in FIG. 5 (D) through (B). Also, in the process in which the swing member 45 turns from the second restricting position 45B to the first restricting position 45A, the engaging pin 48 comes off the engaging recess 45a as shown in FIG. 5 (B). Further, with the further counterclockwise rotation of the third arm 6 by about 330 degrees in FIG. 5, the engaging pin 48 abuts on the other side face of the swing member 45 to restrict the counterclockwise rotation of the third arm 6, as shown in FIG. 5 (A).

As described above, in this embodiment, when the third arm 6 is rotated clockwise in FIG. 5, if the swing member 45 is in the first restricting position 45A, even when the engaging pin 48 reaches the arrangement location of the swing member 45 (the position at which the swing member 45 is swingably attached), the engaging pin 48 can pass the arrangement location of the swing member 45 while turning the swing member 45 toward the second restricting position 45B; therefore, the third arm 6 can be further rotated. On the other hand, when the third arm 6 is rotated clockwise in FIG. 5, if the swing member 45 is in the second restricting position 45B, as the engaging pin 48 reaches the arrangement location of the swing member 45, the engaging pin 48 abuts on the swing member 45 which has already abutted on the stopper 47, and consequently the third arm 6 can rotate no more.

When the third arm is rotated counterclockwise in FIG. 5, if the swing member 45 is in the second restricting position 45B, even when the engaging pin 48 reaches the arrangement location of the swing member 45, the engaging pin 48 can pass the arrangement position of the swing member 45 while turning the swing member 45 toward the first restricting position 45A; therefore, the third arm 6 can further rotate. On the other hand, when the third arm 6 is rotated counterclockwise in FIG. 5, if the swing member 45 is in the second restricting position 45A, as the engaging pin 48 reaches the arrangement location of the swing member 45, the engaging pin 48 abuts on the swing member 45 that has already abutted on the stopper 47, and consequently the third arm 6 can rotate no more.

Note that, in this embodiment, when the swing member 45 is positioned between the first restricting position 45A and the second restricting position 45B, the swing member 45 and the engaging pin 48 are engaged with each other as shown in FIG. 5 (C) such that the outer circumferential face of the engaging pin 48 makes contact with a relatively wide area of the concave surface 45b, and the center of curvature of the concave surface 45b coincides with the center of the engaging pin 48 when viewed in the top-bottom direction. Also, in this embodiment, the second arm 5 is a supporting body that supports the third arm 6 rotatable 360 degrees or more and 720 degrees or less, and the third arm 6 is a rotating body which is rotatable 360 degrees or more and 720 degrees or less.

The first magnetic holding mechanism 51 is configured by a magnetic member 55 affixed to the swing member 45 and a permanent magnet 56 affixed to the second arm 5. The second magnetic holding mechanism 52 is, in the same manner as the first magnetic holding mechanism 51, configured by a magnetic member 57 affixed to the swing member 45 and a permanent magnet 58 affixed to the second arm 5.

The magnetic members 55 and 57 are formed in a cylindrical shape and affixed to the bottom of the swing member 45. Also, the magnetic members 55 and 57 are affixed to the swing member 45 at the both sides of the engaging recess 45a such that the engaging recess 45a is sandwiched by the magnetic member 55 and the magnetic member 57. The permanent magnets 56 and 58 are formed in a cylindrical shape. The permanent magnet 56 is affixed to the second arm 5 to be adjacent to the stopper 46, and the permanent magnet 58 is affixed to the second arm 5 to be adjacent to the stopper 47. Also, the permanent magnets 56 and 58 are affixed to the second arm 5 such that a gap is created between the bottom face of the magnetic member 55, 57 and the permanent magnet 56, 58 in the top-bottom direction.

As shown in FIGS. 5 (A) and (B), when the swing member 45 is in the first restricting position 45A, part of the magnetic member 55 overlaps with part of the permanent magnet 56 when viewed in the top-bottom direction, and the swing member 45 is held in the first restricting position 45A by the magnetic attraction force generated between the magnetic member 55 and the permanent magnet 56. Note that the center of the magnetic member 55 is shifted from the center of the permanent magnet 56 when viewed in the top-bottom direction so that the magnetic attraction is produced to press one side face of the swing member 45 against the stopper 46 when the swing member 45 is in the first restricting position 45A.

As shown in FIGS. 5 (D) and (E), when the swing member 45 is in the second restricting position 45B, part of the magnetic member 57 is overlapped with part of the permanent magnet 58 when viewed in the top-bottom direction, and the swing member 45 is held in the second restricting position 45B by the magnetic attraction produced between the magnetic member 57 and the permanent magnet 58. Note that the center of the magnetic member 57 is shifted from the center of from the permanent magnet 58 when viewed in the top-bottom direction so that the magnetic attraction is produced to press the other side face of the swing member 45 against the stopper 47 when the swing member 45 is in the second restricting position 45B.

The second detecting mechanism 33 is also provided with an optical sensor 61 in which a light emitting device and a light sensing device are arranged opposite from each other and a light-shielding member 62 affixed to the swing member 45. The optical sensor 61 is affixed to the second arm 5. The light-shielding member 62 is affixed to the swing member 45 such that it can interrupt the light emitted from the light emitting device to the light sensing device of the optical sensor 61. The light-shielding member 62 of this embodiment is a second section-to-be-detected, and the optical sensor 61 is a second detecting section that detects the light-shielding member 62 which is the second section-to-be-detected.

In this embodiment, as shown in FIG. 5 (A), when the swing member 45 is in the first restricting position 45A, the light-shielding member 62 interrupts the light emitted from the light emitting device to the light sensing device of the optical sensor 61; as shown in FIG. 5 (E), when the swing member 45 is in the second restricting position 45B, the light-shielding member 62 is off the optical path between the light emitting device and light sensing device of the optical sensor 61. In other words, in this embodiment, the swing member 45 is attached to the second arm 5 such that the optical sensor 61 switches between ON and OFF at one position in the rotating range of the third arm 6. More specifically, the swing member 45 is attached to the second arm 5 such that the optical sensor 61 switches between ON and OFF at the center position in the rotating range of the third arm 6.

Also, in this embodiment, the light-shielding member 62 interrupts the optical path between the light emitting device and the light sensing device of the optical sensor 61 when the swing member 45 is in the first restricting position 45A, and the light-shielding member 62 comes off the optical path between the light emitting device and the light sensing device of the optical sensor 61 when the swing member 45 is in the second restricting position 45B; therefore, it can be detected by the optical sensor 61 and the light-shielding member 62 which position, the first restricting position 45A or the second restricting position 45B, the swing member 45 is in.

The first detecting mechanism 32 is provided with a proximity sensor 59 affixed to the second arm 5 and a magnetic member 60 affixed to the third arm 6. The proximity sensor 59 is affixed to the second arm 5 such that the third reduction gear 25 is sandwiched between the swing member 45 and the proximity sensor 59. In other words, the proximity sensor 59 is affixed to the second arm 5 more toward the front end of the second arm 5 than the third reduction gear 25. Also, the proximity sensor 59 is affixed to the second arm 5 such that the detecting face thereof faces up. The magnetic member 60 is formed in a plate shape and affixed to the third arm 6 to run above the detecting face of the proximity sensor 59. Also, the magnetic member 60 is formed in an arc shape so that the proximity sensor 59 can detect the magnetic member 60 within the range of a predetermined rotating angle of the third arm 6 with respect to the second arm 5. The magnetic member 60 of this embodiment is the first section-to-be-detected, and the proximity sensor 59 is the first detecting section that detects the magnetic member 60 which is die first section-to-be-detected.

In this embodiment, the third arm 6 is formed of a nonmagnetic material such as aluminum; the magnetic member 60 is detected by the proximity sensor 59 to detect that the third arm 6 is in a specific position with respect to the second arm 5. Also, in this embodiment, the proximity sensor 59 and the magnetic member 60 are so arranged that the magnetic member 60 can be detected by the proximity sensor 59 at two positions in the rotating range of the third arm 6.

Also, in this embodiment, as shown in FIG. 6 (A), when the third arm 6 is in its original position, the magnetic member 60 is in the position to be detected by the proximity sensor 59 and the optical sensor 61 is at the border position to switch between ON and OFF. More specifically, the state of the mechanism in which the third arm 6 is in its original position is the state in which the proximity sensor 59 is at the border position to switch between ON and OFF and the optical sensor 61 is at the border position to switch between ON and OFF; the proximity sensor 59 and the magnetic member 60 and also the optical sensor 61 and the light-shielding member 62 are arranged such that the state of the mechanism in which the third arm 6 is in its original position is the state in which those components are in such positions.

As described above, the third arm 6 of this embodiment is rotatable about 700 degrees, and the swing member 45 is attached to the second arm 5 such that the optical sensor 61 switches between ON and OFF when the third arm 6 is in the center position of the rotating range. In other words, the third arm 6 is rotatable about 350 degrees clockwise and rotatable about 350 degrees counterclockwise from the border position at which the optical sensor 61 switches between ON and OFF. Also, as described above, the magnetic member 60 is formed in an arc shape. More specifically, the magnetic member 60 is formed in an arc shape having the center of curvature same as the center of the third reduction gear 25 (that is, the center of rotation of the third arm 6), and the central angle θ of the magnetic member 60 (see FIG. 6 (A)) is about 44 degrees. Further, the clockwise rotating direction in FIG. 6 is defined as "clockwise" and the counterclockwise rotating direction in FIG. 6 is defined as "counterclockwise"; in this embodiment, the proximity sensor 59 and the magnetic member 60 are arranged such that the counterclockwise end of the magnetic member 60 reaches the proximity sensor 59 when the third arm 6 is at the border position at which the optical sensor 61 switches between ON and OFF.

Therefore, when the third arm 6 rotates between the original position shown in FIG. 6 (A) and the position at which the engaging pin 48 abuts on the swing member 45 to restrict the counterclockwise rotation of the third arm 6 (the position shown in FIG. 6 (C)), the proximity sensor 59 detects the magnetic member 60 and turns ON while the third arm 6 is between the position at which the third arm 6 is rotated by 44 degrees from the original position (the position shown in FIG. 6 (B)) and the original position. Also, the proximity sensor 59 is OFF between the position at which the third arm 6 is rotated by 44 degrees from the original position (shown in FIG. 6 (B)) and the position at which the counterclockwise rotation of the third arm 6 is restricted (FIG. 6 (C)). Also, when the third arm 6 rotates between the original position and the position at which the counterclockwise rotation of the third arm 6 is restricted, the optical sensor 61 is ON.

When the third arm 6 rotates between the original position shown in FIG. 6 (A) and the position (FIG. 6 (E)) at which the engaging pin 48 abuts on the swing member 45 and therefore the clockwise rotation of the third arm 6 is restricted, the proximity sensor 59 is OFF while the third arm 6 is between the position (FIG. 6 ( )) at which the third arm 6 has been rotated by 316 degrees from the original position and the original position but is ON while the third arm 6 is between the position (FIG. 6 (D)) at which the third arm 6 has been rotated by 316 degrees from the original position and the position (FIG. 6 (E)) at which the clockwise rotation of the third arm 6 is restricted. Also, when the third arm 6 rotates between the original position and the position at which the clockwise rotation of the third arm 6 is restricted, the optical sensor 61 is OFF.

FIG. 7 shows the relationship of the rotating angle of the third arm 6 with the detecting range of the optical sensor 61 and the detecting range of the proximity sensor 59 where the rotating angle of the third arm 6 at the border position at which the optical sensor 61 switches between ON and OFF is "0", the rotating angle of the third arm 6 between the border position at which the optical sensor 61 switches between ON and OFF and the position in which the counterclockwise rotation of the third arm 6 is restricted is positive, and the rotating angle of the third arm 6 between the border position at which the optical sensor 61 switches between ON and OFF and the position at which the clockwise rotation of the third arm 6 is restricted is negative.

Note that, in this embodiment, the rotating mechanism is configured by the second arm 5, the third arm 6, the motor 24, the motor controlling section 30, the first detecting mechanism 32 and the second detecting mechanism 33.

Figure 8:
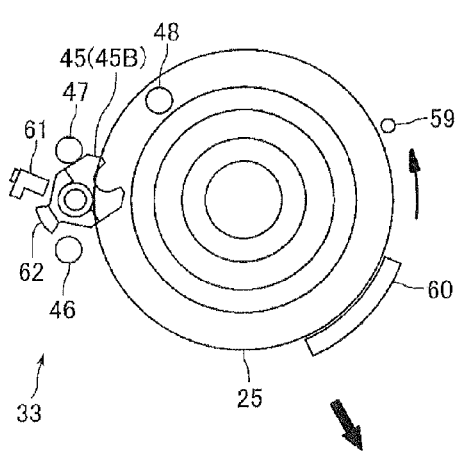
FIG. 8 shows schematic diagrams to explain the method for returning the third arm shown in FIG. 1 to the original position.
Figure 8:
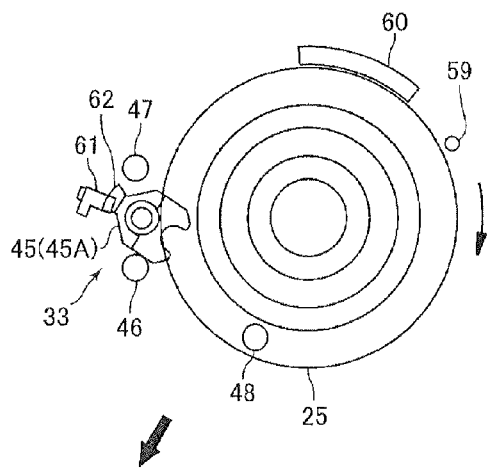
Figure 8:
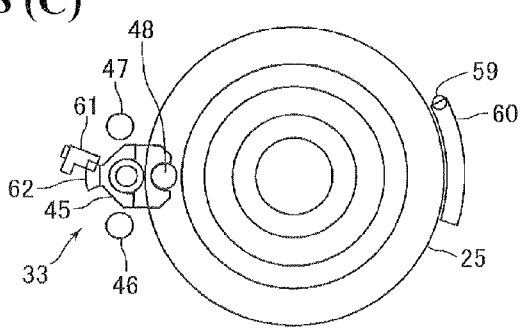
Figure 8:
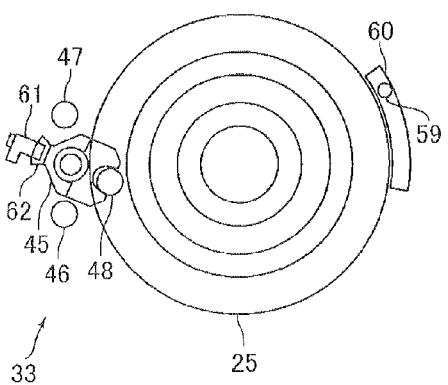
Figure 8:
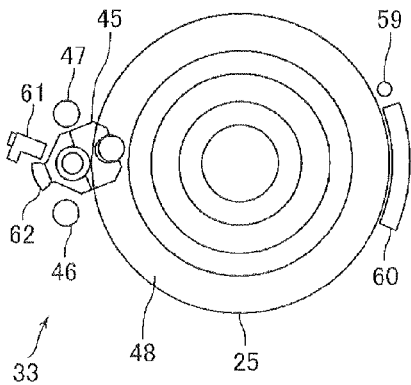

Method for Returning Third Arm to Original Position:

FIG. 8 shows schematic diagrams to explain a method for returning the third arm 6 shown in FIG. 1 to the original position.

As described above, the third arm 6 is rotatable about 700 degrees with respect to the second arm 5, and the proximity sensor 59 and the magnetic member 60 are arranged such that the magnetic member 60 is detected by the proximity sensor 59 between the original position and the position at which the third arm 6 is rotated by 44 degrees from the original position and between the position at which the third arm 6 is rotated by 316 degrees from the original position and the position at which the clockwise rotation of the third arm 6 is restricted. For this reason, there are two different states at the very moment when the magnetic member 60 is detected by the proximity sensor 59: the state as shown in FIG. 6 (A), in which the third arm 6 is in the original position, and the state as shown in FIG. 6 (D), in which the swing member 45 is in the second restricting position 45B. In other words, in this embodiment, the function of the first detecting mechanism 32 alone is insufficient to detect if the third arm 6 is in the original position.

Therefore, the motor controlling section 30 keeps track of the rotating position of the motor 24 (that is, the rotating position of the third arm 6) during a normal operation; however, the motor controlling section 30 sometimes loses track of the rotating position of the third arm 6 for some reasons such as an error in the robot 1. If this is the case, the third arm 6 needs to be returned to its original position; however, the function of the first detecting mechanism alone is insufficient to detect accurately that the third arm 6 is in the original position, and accordingly the third arm 6 cannot be returned to the original position depending alone on the detection result of the first detecting mechanism 32. Therefore, in this embodiment, the third arm 6 is returned to the original position by using both the detection result of the first detecting mechanism 32 and the detection result of the second detecting mechanism 33. More specifically, the third arm 6 is returned to the original position as in the description below.

When returning the third arm 6 to its original position, the third arm 6 is first rotated to the position at which the optical sensor 61 switches between ON and OFF, based on the detecting status of the optical sensor 61 (First rotating step). In other words, when returning the third arm 6 to its original position, the motor controlling section 30 first checks on the detecting status of the optical sensor 61 and controls the motor 24 to rotate the third arm 6 to the position at which the optical sensor 61 switches between ON and OFF, based on the detecting status of the optical sensor 61.

More specifically, when the state of the mechanism in which an attempt will be made to return the third arm 6 to the original position is the state shown in FIG. 8 (A), in which the swing member 45 is in the second restricting position 45B and the optical sensor 61 is OFF, the third arm 6 is rotated counterclockwise to the position at which the optical sensor 61 switches between ON and OFF. On the other hand, when the state in which an attempt will be made to return the third arm 6 to the original position is the state shown in FIG. 8 (B), in which the swing member 45 is in the first restricting position 45A and the optical sensor 61 is ON, the third arm is rotated clockwise to the position at which the optical sensor 61 switches between ON and OFF.

After that, as shown in FIG. 8 (D), the third arm 6 is rotated counterclockwise and into the range within which the magnetic member 60 is detected by the proximity sensor 59 (Second rotating step). In other words, as shown in FIG. 7, the third arm 6 is rotated toward "the on-side" in which the proximity sensor 59 turns ON within the positive rotating angle of the third arm 6 and also into the range within which the proximity sensor 59 is ON. In other words, the motor controlling section 30 controls the motor 24 to rotate the third arm 6 counterclockwise and into the range within which the magnetic member 60 is detected by the proximity sensor 59.

Then, as shown in FIG. 8 (E), the third arm 6 is rotated clockwise by a predetermined angle until the magnetic member 60 is no longer detected by the proximity sensor 59 (Third rotating step). In other words, as shown in FIG. 7, the third arm 6 is rotated toward "the off-side" which is the opposite side of "the on-side" and also rotated by a predetermined angle at least until the proximity sensor 59 switches from ON to OFF. In other words, the motor controlling section 30 controls the motor 24 to rotate the third arm 6 clockwise by a predetermined angle until the magnetic member 60 is no longer detected by the proximity sensor 59. In this embodiment, the third arm 6 is rotated clockwise by about 10 degrees, for example.

Finally, as shown in FIG. 8 (C), the third arm 6 is rotated counterclockwise until the magnetic member 60 is detected by the proximity sensor 59 (that is, until the proximity sensor 59 switches from OFF to ON) (Fourth rotating step). In other words, the motor controlling section 30 controls the motor 24 such that the third arm 6 rotates counterclockwise until the magnetic member 60 is detected by the proximity sensor 59. When the fourth rotating step is finished, the third arm 6 is positioned in its original position.

Major Effects of this Embodiment

As described above, in this embodiment, the swing member 45 is attached to the second arm 5 such that the optical sensor 61 switches between ON and OFF at one position in the rotating range of the third arm 6. Also, in this embodiment, when returning the third arm 6 to its original position, the third arm 6 is first rotated to the position at which the optical sensor 61 switches between ON and OFF, based on the detection result of the optical sensor 61 in the first rotating step; then the third arm 6 is rotated counterclockwise and into the range within which the magnetic member 60 is detected by the proximity sensor 59 in the second rotating step; the third arm 6 is then rotated clockwise to the position at which the magnetic member 60 is no longer detected by the proximity sensor 59 in the third rotating step; finally the third arm 6 is rotated counterclockwise until the magnetic member 60 is detected by the proximity sensor 59 in the fourth rotating step.

Therefore, even if the state of the rotating mechanism in which the third arm 6 is in its original position is also the state in which the proximity sensor 59 is at the border position to switch between ON and OFF and in which the optical sensor 61 is at the border position to switch between ON and OFF, the third arm 6 can be properly returned to the original position. In other words, when the state of the mechanism in which the proximity sensor 59 is at the border position to switch between ON and OFF and in which the optical sensor 61 is at the border position to switch between on an off is the state in which the third arm 6 is in its original position, the detecting condition of the optical sensor 61 when the third arm 6 is in its original position may not be reliable depending on the manufacturing precision or attachment precision of the light-shielding member 62 and the swing member 45 or the response precision of the optical sensor 61. For this reason, if the third arm 6 is designed to be returned to the original position according to the on-off status of the proximity sensor 59 and the on-off status of the optical sensor 61, the third arm 6 may not properly be returned to the original position. In this embodiment, however, even if the state in which the third arm 6 is in its original position is the state in which the proximity sensor 59 is at the border position to switch between ON and OFF and in which the optical sensor 61 is at the border position to switch between ON and OFF, the optical sensor 61 can properly be returned to its original position regardless of the on-off status of the optical sensor 61.

Also, in this embodiment, the third arm 6 can precisely be returned to its original position by reducing the rotating speed of the third arm 6 when returning the third arm 6 to its original position.

Further, in this embodiment, when returning the third arm 6 to its original position, the third arm 6 is first rotated to the position at which the optical sensor 61 switches between ON and OFF in the first rotating step; therefore, the third arm 6 can be returned to the original position with certainty by performing the specific series of operations (that is, the operations from the second rotating step to the fourth rotating step) based on the one position in the rotating range of the third arm 6 at which the optical sensor 61 switches between ON and OFF. Therefore, in this embodiment, the third arm 6 can be returned to the original position in a short time with certainty.

In this embodiment, the swing member 45 is held in the first restricting position 45A by the magnetic attraction force of the first magnetic holding mechanism 51, and the swing member 45 is held in the second restricting position 45B by the magnetic attraction force of the second magnetic holding mechanism 52. For this reason, the swing member 45 is kept from being wobbly, increasing detection accuracy of the second detecting mechanism 33 in this embodiment. Also, because the swing member 45 is held by the magnetic attraction force, there is no need to have the member holding the swing member 45 in the first restricting position 45A or in the second restricting position 45B make contact with the swing member 45 so that the swing member 45 is kept from being wobbly even when the swing member 45 is held in the first restricting position 45A or in the second restricting position 45B. Consequently, dust or noise which may be generated with the swing of the swing member 45 between the first restricting position 45A and die second restricting position 45B can be prevented in this embodiment.

In this embodiment, the engaging pin 48 is capable of abutting on the other side face of the swing member positioned in the first restricting position 45A so as to press the one side face of the swing member 45 against the stopper 46 and also is capable of abutting on the one side face of the swing member 45 positioned in the second restricting position 45B so as to press the other side face of the swing member 45 against the stopper 47; the second detecting mechanism 33 also functions to restrict the rotating range of the third arm 6 with respect to the second arm 5. Therefore, there is no need in this embodiment to provide an additional mechanism to restrict the rotating range of the third arm 6. Consequently the configuration of the robot 1 can be simplified in this embodiment.

Other Embodiments

The above-described embodiment is an example of the preferred embodiments of the present invention, but is not limited to this and can be modified varyingly within the scope of the present invention.

Figure 9:
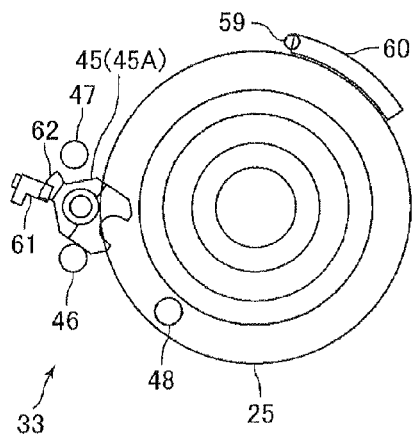
FIG. 9 shows schematic diagrams to explain the original position of the third arm of another embodiment and effects of the present invention.
Figure 9:
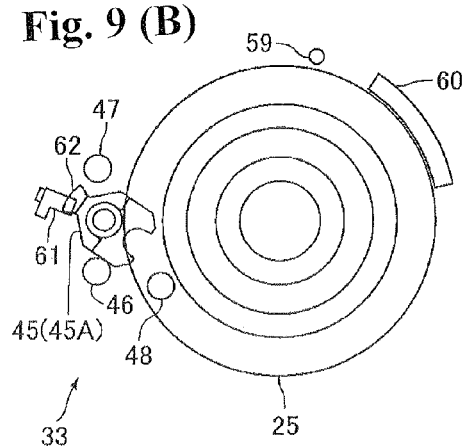
Figure 9:
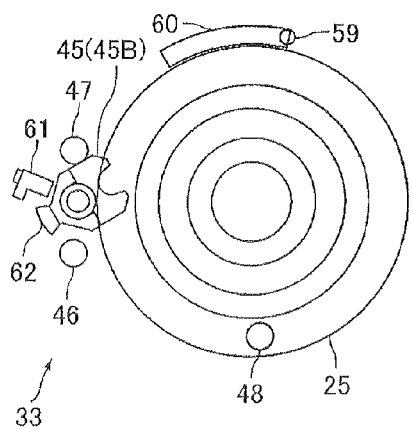
Figure 9:
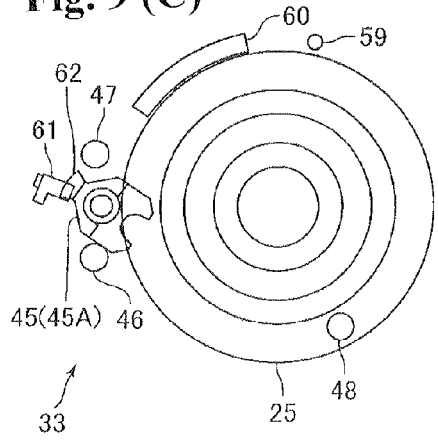
Figure 9:
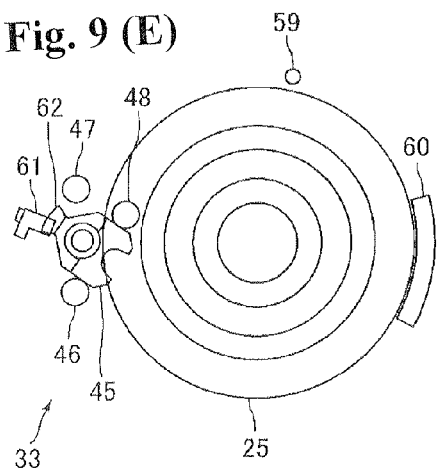

In the above-described embodiment, the state of the mechanism in which the proximity sensor 59 is at the border position to switch between ON and OFF and in which the optical sensor 61 is at the border position to switch between ON and OFF is the state in which the third arm 6 is in its original position. Alternatively, as shown in FIG. 9 (A), the state in which the third arm 6 is in the original position may be the state in which the optical sensor 61 is at the position to be ON and the engaging pin 48 has not reached the other side face of the swing member 45 in the first restricting position 45A and in which the proximity sensor 59 is at the border position to switch between ON and OFF. FIG. 10 shows the relationship between the rotating angle of the third arm 6 with the detecting range of the optical sensor 61 and the detecting range of the proximity sensor 59 in the above case.

In this case, when the motor controlling section 30 loses track of the rotating position of the third arm 6 and makes an attempt to return the third arm 6 to its original position, the above operations from the first rotating step to the fourth rotating step are performed in order to return the third arm 6 to the original position. Also, at that time, the first rotating step is performed and then the third arm 6 may be rotated counterclockwise until the magnetic member 60 is detected by the proximity sensor 59, to be returned to its original position.

Note that the state of the mechanism before the third arm 6 is returned to the original position shown in FIG. 9 (A) can be the state as shown in FIG. 9 (B), in which the optical sensor 61 is ON and the magnetic member 60 is positioned on the clockwise side of the proximity sensor 59 or the state as shown in FIG. 9 (C), in which the optical sensor 61 is ON and the magnetic member 60 is positioned on the counterclockwise side of the proximity sensor 59.

Here, when returning the third arm 6 from the state shown in FIG. 9 (B) to its original position by first rotating the third arm 6 until the magnetic member 60 is detected by the proximity sensor 59 and by checking on the on-off status of the optical sensor 61 when the magnetic member 60 is detected by the proximity sensor 59, the third arm 6 is rotated counterclockwise to be returned to the original position in a short time. On the other hand, if the third arm 6 is rotated clockwise, the status of the third arm 6 when the magnetic member 60 is detected by the proximity sensor 59 is in status as shown in FIG. 9 (D); therefore, the third arm 6 cannot be returned to its original position unless rotated counterclockwise again.

When returning the third arm 6 from the state shown in FIG. 9 (C) to its original position by this method, the third arm 6 can be returned to the original position in a short time through a clockwise rotation. On the other hand, if the third arm 6 is rotated counterclockwise, the engaging pin 48 abuts on the side face of the swing member 45 positioned in the second restricting position 45B, as shown in FIG. 9 (E); therefore, the third arm 6 cannot be returned to its original position unless rotated clockwise again.

In the state shown by FIG. 9 (B) and the state shown by FIG. 9 (C), the optical sensor 61 is ON; therefore, the rotating direction cannot be determined to return the third arm 6 to its original position by using the on-off status of the optical sensor 61. For this reason, if an attempt is made to return the third arm 6 to the original position by rotating the third arm 6 until the magnetic member 60 is detected by the proximity sensor 59 and by checking on the on-off status of the optical sensor 61 when the magnetic member 60 is detected by the proximity sensor 59, the third arm 6 may not be returned to the original position in a short time depending on where the original position of the third arm 6 is set.

On the other hand, if the third arm 6 is first rotated to the position at which the optical sensor 61 switches between ON and OFF, then a specific series of operations can be performed, based on the one position in the rotating range of the third arm 6 at which the optical sensor 61 switches between ON and OFF, to return the third arm 6 to the original position with certainty. In other words, unlike the case in which the third arm 6 is returned to the original position by being rotated until the magnetic member 60 is detected by the proximity sensor 59 and by checking on the on-off status of the optical sensor 61 observed when the magnetic member 60 is detected by the proximity sensor 59, if the third arm 6 is first rotated to the position at which optical sensor 61 switches between ON and OFF, the third arm 6 can be returned to the original position in a short time with certainty no matter to which position the original position of the third arm 6 is set.

Also, the state of the mechanism in which the third arm 6 is in the original position may be the state shown in FIG. 9 (D), in which the optical sensor 61 is OFF and the engaging pin 48 has not reached the other side face of the swing member 45 positioned in the second restricting position 45B and also in which the proximity sensor 59 is at the border position to switch between ON and OFF. FIG. 11 shows the relationship of the rotating angle of the third arm 6 with the detecting range of the optical sensor 61 and the detecting range of the proximity sensor 59 in this case.

In this case, when the third arm 6 needs to be returned to the original position because the motor controlling section 30 has lost track of the rotating position of the third arm 6, the third arm 6 is first rotated into the position at which the optical sensor 61 switches between ON and OFF, based on the detection result of the optical sensor 61 (First rotating step). The third arm 6 is then rotated clockwise into the range within which the magnetic member 60 is detected by the proximity sensor 59 (Second rotating step). In other words, as shown in FIG. 11, the third arm 6 is rotated toward "the on-side" in which the proximity sensor 59 is ON within the range of the negative rotating angle of the third arm 6, and the third arm 6 is also rotated into the range within which the proximity sensor is ON. After that, the third arm 6 is rotated counterclockwise at a predetermined angle until the magnetic member 60 is no longer detected by the proximity sensor 59 (Third rotating step). In other words, as shown in FIG. 11, the third arm 6 is rotated toward "the OFF-side" which is the opposite side of "the ON-side", and also rotated at a predetermined angle at least until the proximity sensor 59 switches from ON to OFF. Finally, the third arm 6 is rotated counterclockwise until the magnetic member 60 is detected by the proximity sensor 59 (Fourth rotating step) to be returned to the original position. In this case, after the above-described first rotating step is performed, the third arm 6 may be rotated clockwise until the magnetic member 60 is detected by the proximity sensor 59, to be returned to the original position.

Figure 12:
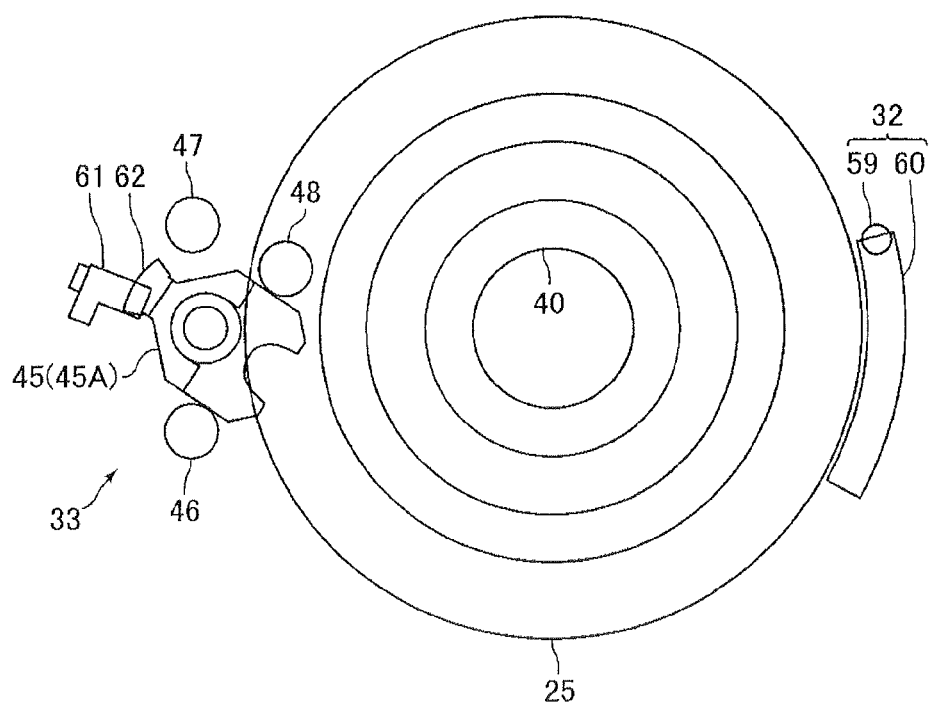
FIG. 12 shows diagram to explain the original position for the third arm of another embodiment of the present invention.

Also, as shown in FIG. 12, the state of the mechanism in which the third arm 6 is in its original position may be the state in which the optical sensor 61 is ON and the engaging pin 48 abuts on the other side face of the swing member 45 positioned in the first restricting position 45A and in which the proximity sensor 59 is at the border position to switch between ON and OFF. Note that, in this case, since the rotating direction of the third arm 6 to return the third arm 6 to the original position can be determined based on the on-off status of the optical sensor 61, even when the third arm 6 is returned to the original position by rotating the third arm 6 until the magnetic member 60 is detected by the proximity sensor 59 and by checking on the on-off status of the optical sensor 61 observed when the magnetic member 60 is detected by the proximity sensor 59, it can be returned in a short time with certainty.

In the above-described embodiment, the proximity sensor 59 and the magnetic member 60 are arranged such that the magnetic member 60 is detected by the proximity sensor 59 at two positions in the rotating range of the third arm 6. Alternatively, the proximity sensor 59 and the magnetic member 60 may be arranged such that the magnetic member 60 is detected by the proximity sensor 59 at one position in the rotating range of the third arm 6.

In the above-described embodiment, in the second rotating step the third arm 6 is rotated counterclockwise and rotated into the range within which the magnetic member 60 is detected by the proximity sensor 59. Alternatively, the third arm 6 may be rotated counterclockwise and also rotated at a predetermined angle until the magnetic member 60 is no longer detected by the proximity sensor 59. In this case, in the third rotating step the third arm 6 is rotated clockwise; after the magnetic member 60 is detected by the proximity sensor 59, the third arm 6 is again rotated at a predetermined angle until the magnetic member 60 is no longer detected by the proximity sensor 59.

In the above-described embodiment, the proximity sensor 59 is affixed to the second arm 5 and the magnetic member 60 is affixed to the third arm 6; however, the proximity sensor 59 may be affixed to the third arm 6 and the magnetic member 60 may be affixed to the second arm 5. Also, in the above-described embodiment, the optical sensor 61 is affixed to the second arm 5 and the light-shielding member 62 is affixed to the swing member 45; however, the optical sensor 61 may be affixed to the swing member 45 and the light-shielding member 62 may be affixed to the second arm 5. Further, in the above-described embodiment, the first detecting mechanism 32 is provided with the proximity sensor 59; however, the first detecting mechanism 32 may be provided with another sensor such as an optical sensor in place of the proximity sensor 59. In the same manner, the second detecting mechanism 33 may be provided with another sensor such as a proximity sensor in place of the optical sensor 61.

In the above-described embodiment, the magnetic member 55 is affixed to the swing member 45 and the permanent magnet 56 is affixed to the second arm 5; however, the magnetic member 55 may be affixed to the second arm 5 and the permanent magnet 56 be affixed to the swing member 45 instead. In the same manner, the magnetic member 57 is affixed to the swing member 45 and the permanent magnet 58 is affixed to the second arm 5 in the above-described embodiment; however, the magnetic member 57 may be affixed to the second arm 5 and the permanent magnet 58 may be affixed to the swing member 45 instead. Also, if the swing member 45 is formed of a magnetic material, the magnetic members 55, 57 may not be affixed to the swing member 45.

Also, the first magnetic holding mechanism 51 and the second magnetic holding mechanism 52 may be provided, in place of the magnetic members 55 and 57, with permanent magnets that are affixed to the swing member 45. In this case, the permanent magnets that are to be affixed to the singing member 45 are magnetized and arranged such that the swing member 45 is held in the first restricting position 45A or the second restricting position 45B by the magnetic attraction force produced between the permanent magnet affixed to the swing member 45 and the permanent magnet 56, 58. Alternatively, the permanent magnets that are to be affixed to the swing member 45 are magnetized and arranged such that the swing member 45 is held in the first restricting position 45A or in the second restricting position 45B by the magnetic repelling force produced between the permanent magnet affixed to the swing member 45 and the permanent magnet 56, 58.

In the above-described embodiment, the second detecting mechanism 33 also functions to restrict the rotating range of the third arm 6 with respect to the second arm 5. Alternatively, a mechanism to restrict the rotating range of the third arm 6 with respect to the second arm 5 may be additionally provided.

In the above-described embodiment, the first detecting mechanism 32 and the second detecting mechanism 33 are provided to detect if the third arm 6 is in its original position. Alternatively, when the first arm 4 rotates 360 degrees or more and 720 degrees or less with respect to the main body section 3, for example, the first detecting mechanism 32 and the second detecting mechanism 33 may be used to detect if the first arm 4 is in its original position. Also, when the second arm 5 rotates 360 degrees or more and 720 degrees or less with respect to the first arm 4, the first detecting mechanism 32 and the second detecting mechanism 33 may be used to detect if the second arm 5 is in its original position. Further, when the hands 7 and 8 rotate at 360 degrees or more and 720 degrees or less with respect to the third arm 6, the first detecting mechanism 32 and the second detecting mechanism 33 may be used to detect if the hands 7 and 8 are in its original positions.

In the above-described embodiment, the robot 1 is a robot for transporting semi-conductor wafers 2; however, the robot 1 may be a transporting robot to transport other objects such as LC glass substrates or an industrial robot such as an assembling robot other than the transporting robot. In other words, the first detecting mechanism 32 and the second detecting mechanism 33 may be adopted in other robots other than the robot 1. Also, the first detecting mechanism 32 and the second detecting mechanism 33 may be adopted in various devices other than robots having a rotating body rotatable 360 degrees or more and 720 degrees or less with respect to the supporting body.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

DESCRIPTION OF CODES

1 Robot (Industrial robot)
3 Main body section
4 First arm
5 Second arm (Supporting body, part of the rotating mechanism)
6 Third arm (Rotating body, part of the rotating mechanism)
7, 8 Hand
24 Motor (Second drive motor, part of the rotating mechanism)
30 Motor controlling section (Motor controlling means, part of the rotating mechanism)
32 First detecting mechanism (part of the rotating mechanism)
33 Second detecting mechanism (part of the rotating mechanism)
45 Swing member
45A First restricting position
45B Second restricting position
46 Stopper (First restricting member)
47 Stopper (Second restricting member)
48 Engaging pin (Engaging member)
51 First magnetic holding mechanism
52 Second magnetic holding mechanism
59 Proximity sensor (First detecting section)
60 Magnetic member (First section-to-be-detected)
61 Optical sensor (Second detecting section)
62 Light-shielding member (Second section-to-be-detected)

What is claimed is:

1. A rotating mechanism comprising:
a supporting body;
a rotating body rotatable 360 degrees or more and 720 degrees or less with respect to said supporting body;
a motor which rotates said rotating body;
a first detecting mechanism and a second detecting mechanism which detect that said rotating body is in an original position; and
a motor controlling means which controls said motor;
wherein said first detecting mechanism detects a first section-to-be-detected, and comprises:
the first section-to-be-detected, which is affixed or formed to either said supporting body or said rotating body; and
a first detecting section, which is affixed to the other of either said supporting body or said rotating body;
wherein said second detecting mechanism detects a second section-to-be-detected, and comprises:
a swing member, which is swingably attached to said supporting body;
an engaging member, which is affixed or formed to said rotating body and engages with said swing member to swing said swing member;
the second section-to-be-detected, which is affixed or formed to either said swing member or said supporting body; and
a second detecting section which is affixed to the other of either said swing member or said supporting body which is configured to detect said second-section-to-be-detected;
wherein said first section-to-be-detected and said first detecting section are arranged such that said first section-to-be-detected is detected by said first detecting section at one or two positions within a rotating range of said rotating body;
wherein said swing member is attached to said supporting body such that said second detecting section switches between ON and OFF at one position in the rotating range of said rotating body; and
wherein said motor controlling means is configured to control said motor so that, when returning said rotating body to the original position, said rotating body is rotated to the position at which said second detecting section switches between ON and OFF.

2. The rotating mechanism as set forth in claim 1;
wherein said motor controlling means is configured to control said motor to return said rotating body to its original position so that:
after being rotated to the position at which said second detecting section switches between ON and OFF, said rotating body is next rotated in a predetermined first rotating direction and into the range within which said first section-to-be-detected is detected by said first detecting section;
said rotating body is then rotated in a second rotating direction, which is an opposite direction from said first rotating direction, until said first section-to-be-detected is no longer detected by said first detecting section; and
finally said rotating body is rotated in said first rotating direction until said first section-to-be-detected is detected by said first detecting section.

3. The rotating mechanism as set forth in claim 2;
wherein said second detecting mechanism comprises:
a first restricting member which is affixed or formed to said supporting body, and which restricts one end of a swing range of said swing member by abutting on said swing member when said swing member is rotated to the one end of the swing range of said swing member; and
a second restricting member which is affixed or formed to said supporting member, and which restricts the other end of the swing range of said swing member by abutting on said swing member when said swing member is rotated to the other end of the swing range of said swing member;
wherein said engaging member allows said swing member swing between a first restricting position at which said swing member abuts on said first restricting member and a second restricting position at which said swing member abuts on said second restricting member; and
wherein said second detecting mechanism detects which position, of said first restricting position and said second restricting position, said swing member is in, by said second section-to-be-detected and said second detecting section.

4. The rotating mechanism as set forth in claim 3;
wherein said second detecting mechanism further comprises:
a first magnetic holding mechanism that holds said swing member in said first restricting position by a magnetic attraction force or magnetic repelling force; and
a second magnetic holding mechanism that holds said swing member in said second restricting position by a magnetic attraction force or magnetic repelling force.

5. The rotating mechanism as set forth in claim 4;
wherein said engaging member is configured to move between a first position abutting on said swing member so as to press said swing member positioned in said first restricting position against said first restricting member, and a second position abutting on said swing member so as to press said swing member positioned in said second restricting position against said second restricting member.

6. An industrial robot comprising:
said rotating mechanism as set forth in claim 1;
a main body section;
a first arm having a base end which is turnably joined to said main body section;
a second arm, as said supporting body, having a base end which is turnably joined to a front end of said arm;
a third arm, as said rotating body, having a base end which is rotatably joined to a front end of said second arm; and
a hand having a base end which is rotatably joined to a front end of said third arm.

7. A method for returning a rotating body to an original position comprising:
providing a supporting body;
providing a rotating body rotatable 360 degrees or more and 720 degrees or less with respect to said supporting body; and
providing a first detecting mechanism and a second detecting mechanism which detects that said rotating body is in the original position;
wherein said first detecting mechanism detects a first section-to-be-detected, and comprises:
the first section-to-be-detected, which is affixed or formed to either said supporting body or said rotating body; and
a first detecting section, which is affixed or formed to the other of either said supporting body or said rotating body;
wherein said second detecting mechanism detects a second section-to-be-detected, and comprises:
a swing member, which is swingably attached to said supporting body;
an engaging member, which is affixed or formed to said rotating body and engages with said swing member to swing said swing member;
the second section-to-be-detected, which is affixed or formed to either said swing member or said supporting body which is configured to detect said second-section-to-be-detected; and
a second detecting section which is affixed to the other of either said swing member or said supporting body;
wherein said first section-to-be-detected and said first detecting section are arranged such that said first section-to-be-detected is detected by said first detecting section at one or two positions in a rotating range of said rotating body;
wherein said swing member is attached to said supporting body such that said second detecting section switches between ON and OFF at one position in the rotating range of said rotating body; and
wherein a first rotating step is performed in which, when returning said rotating body to the original position, said rotating body is first rotated to the position at which said second detecting section switches between ON and OFF.

8. The method for returning a rotating body to the original position as set forth in claim 7, further comprising:
a second rotating step, performed after said first rotating step, in which said rotating body is rotated in a predetermined rotating direction and into the range within which said first section-to-be-detected is detected by said first detecting section;
a third rotating step, performed after said second rotating step, in which said rotating body is rotated in a second rotating direction, which is an opposite direction from said first rotating direction, until said first section-to-be-detected is no longer detected by said first detecting section; and
a fourth rotating step, performed after said third rotating step, in which said rotating body is rotated in said first rotating direction until said first section-to-be-detected is detected by said first detecting section.

* * * * *